US010110633B2

(12) United States Patent
Laoutaris et al.

(10) Patent No.: US 10,110,633 B2
(45) Date of Patent: Oct. 23, 2018

(54) METHOD, A DEVICE AND COMPUTER PROGRAM PRODUCTS FOR PROTECTING PRIVACY OF USERS FROM WEB-TRACKERS

(71) Applicant: Telefonica, S.A., Madrid (ES)

(72) Inventors: Nikolaos Laoutaris, Madrid (ES); Jeremy Blackburn, Madrid (ES)

(73) Assignee: Telefonica, S.A., Madrid (ES)

( * ) Notice: Subject to any disclaimer, the term of this patent is extended or adjusted under 35 U.S.C. 154(b) by 325 days.

(21) Appl. No.: 14/942,319

(22) Filed: Nov. 16, 2015

(65) Prior Publication Data

US 2017/0142158 A1    May 18, 2017

(51) Int. Cl.
*H04L 29/06* (2006.01)
*H04L 29/08* (2006.01)

(52) U.S. Cl.
CPC .............. *H04L 63/20* (2013.01); *H04L 63/10* (2013.01); *H04L 67/02* (2013.01); *H04L 67/306* (2013.01)

(58) Field of Classification Search
CPC .......... H04L 63/20; H04L 63/10; H04L 67/02; H04L 67/306
See application file for complete search history.

(56) References Cited

U.S. PATENT DOCUMENTS

| | | | |
|---|---|---|---|
| 7,562,387 B2* | 7/2009 | Nguyen | H04L 63/04 726/22 |
| 2011/0035280 A1* | 2/2011 | Fordyce, III | G06Q 20/10 705/14.53 |
| 2011/0087547 A1* | 4/2011 | Amaro | G06Q 30/02 705/14.53 |
| 2012/0072997 A1* | 3/2012 | Carlson | G06Q 30/02 726/28 |
| 2013/0204703 A1* | 8/2013 | Carlson | G06Q 30/0258 705/14.56 |
| 2013/0332361 A1* | 12/2013 | Ciurea | G06Q 20/405 705/44 |
| 2013/0332362 A1* | 12/2013 | Ciurea | G06Q 20/383 705/44 |
| 2014/0040134 A1* | 2/2014 | Ciurea | G06Q 20/383 705/44 |
| 2014/0337089 A1* | 11/2014 | Tavares | G06Q 30/0201 705/7.29 |

\* cited by examiner

*Primary Examiner* — Kambiz Zand
*Assistant Examiner* — Tongoc Tran
(74) *Attorney, Agent, or Firm* — Sughrue Mion, PLLC

(57) ABSTRACT

The method comprising:
 capturing and removing a public unique identifier set by a Website (300) in a computing device (100D) of a user (100);
 monitoring, during a first time-period, web-requests the user (100) makes to obtain a web-behavioral profile of the user (300), and storing the obtained web-behavioral profile as a first vector;
 tracking, during a second time-period, the web-requests to examine the effect each web-request has on assisting the de-anonymization of the user (100), obtaining a second vector;
 classifying, the obtained second vector taking into account a computed similarity score parameter;
 creating and mapping, a corresponding private unique identifier for said captured public identifier; and
 executing, based on said mapping between the private and the public unique identifiers, an intervention algorithm for said web-tracker, that considers a configured intervention policy.

20 Claims, 6 Drawing Sheets

METHOD, A DEVICE AND COMPUTER PROGRAM PRODUCTS FOR PROTECTING PRIVACY OF USERS FROM WEB-TRACKERS

FIELD OF THE ART

The present invention is directed, in general, to the field of internet security. In particular, the invention relates to a method, to a device, and to computer program products for protecting privacy of users from web-trackers.

Definitions

By a user's browsing history it has to be understood a vector of domain and visit frequency tuples over a given time period. This need not be all the domains that a user has visited but those where a certain tracker that is attempting the re-identification attack, is present with tracking unique identifiers.

By user's signature it has to be understood browsing history collected over some time interval in the past. During this interval the tracker has constructed the behavioral patterns of the user. A tracker can search for this patterns in arbitrary page visiting logs and re-identify the user even if the latter has changed unique identifiers in-between. This can also be used to match users/clients between computing devices.

By similarity it has to be understood a measure of the "closeness" of two users. $\theta$ $(h_1, h_2)$ it is used to represent the similarity between two browsing histories.

By similarity rank it has to be understood a ranking of similarity scores between histories as a measure of re-identifiability. When it is said rank ($\theta$ $(h_1, h_2)$)=K it means that $h_2$ is the Kth most similar history to $h_1$ (with K=1 meaning it is the closest). It has to be noted also that a particular similarity rank is dependent on the particular similarity measure being used; however it remains independent as a concept and applies to any chosen similarity measure.

BACKGROUND OF THE INVENTION

The massive growth of the web has been funded almost entirely via advertisements shown to users. Web advertisements have proven superior to traditional advertisements for several reasons, the most prominent being the ability to show personally relevant advertisements. To serve the most relevant advertisements, web advertisement agencies rely on mechanisms to uniquely identify and track user behavior over time. Known as trackers, these systems are able to uniquely identify a user via a variety of methods (e.g., persistent cookies, browser fingerprinting, etc.) and over time can build up enough information about a user to show targeted advertisements.

While advertisement agency's use of trackers has enabled the free-to-use model of the web, it also raises invasion of privacy concerns. These concerns have led to the creation of client side applications that block trackers and advertisements, for example AdBlock. While AdBlock has been quite successful in mitigating users' exposure to trackers, by definition it prevents the display of advertisements, and thus hurts web services' revenue streams.

There are four main entities in the advertisement ecosystem that are considered by the present invention: 1) the user, 2) the publisher, 3) the advertiser, and 4) the advertising network. The user visits web pages provided by the publisher who in turn obtains revenues through display advertisements paid by advertisers. The advertising network is the entity that coordinates the whole process.

The publishers, advertisers, and advertising networks have a common financial interest to increase the click through and conversion rates of users; i.e., the probability that a user actually clicks on an ad and makes a purchase. This is where Online Behavioral Advertising (OBA) comes into play, as it has been shown to significantly increase the click through rate.

For OBA to work, advertising networks need to track the activity of users across the web. This is achieved by placing tracking beacons in publishers' websites. The tracking beacons are usually small images embedded on the webpage code that trigger a request to the tracker's server. When a new user visits a website that is tracked by an advertisement network, his browser downloads the image, and the server in turn sets a cookie that is associated to this user. Subsequent requests to any website where the advertisement network has access will return the same cookie, therefore allowing the tracking of a user across the web.

Apart from that, personally identifiable information (PII) can be leaked through a variety of means, for example passing email addresses, real names, etc. as HTTP arguments after filling web forms [3]. When such PII leakage occurs in a page that hosts tracking cookies, then trackers can associate the real-world identity with online presence at any websites the cookie is observed. This is a very serious threat to one's privacy. Notice here that online behavioral targeting doesn't really need the association between the PII info and the cookie. All that is required is a constant identifier (e.g., a cookie) to be able to say that user X seen at foo.com is the same one now visiting bar.com. Such a constant identifier is effectively anonymous if it is not connected to PII.

This means that as long as users make sure that PII does not leak, then OBA can be carried out while the users remains anonymous. Eliminating all PII leakage however is quite difficult and in many cases impossible to achieve without breaking much of the web's usability. An alternative to blocking all PII is to just monitor it and when it happens clear all cookies to prevent matching the users PII with the past and future web sites that he will visit. For this to work, however, one has to protect against search and re-identification of individuals with leaked PII.

The tracker already has a sample of the behavioral pattern of this named user. Even if the user clears all his cookies, as soon as he accepts a new cookie from a site that the tracker operates on he risks re-identification and re-association to his real-world identity through a simple comparison of his sampled behavior as a named user and his newly accumulating behavior under the new identifier (cookie). In fact, re-identifying a user by comparing profiles associated with different cookies is a corner stone of the burgeoning cross device identification industry [4].

Thus, the overarching threat to identity privacy is the linking of online behavioral profiles to an individual user. Present invention addresses this threat model by ensuring that the profiles trackers build up are not uniquely identifiable, yet still contain useful behavioral information.

In addition, at the core of the problem of re-identifying users based on browsing behavior is the surprising "uniqueness" of people's browsing profiles using e.g., frequency histograms of visits to websites hosting tracking cookies.

Current existing technologies such as AdNostic [1] and Privad [2] aim to preserve privacy of the users with respect to OBA, but unlike them, the proposed device is transparent to trackers and does not require any change in the infrastructure of the advertisement ecosystem. The major problem with these technologies is that they require fundamental changes to the current advertising ecosystem. In short, at minimum they require changes to the way that advertising networks operate, and likely changes to users' clients as well.

In addition services like AdBlock, Disconnect.me, and Ghostery take an alternative approach whereby they attempt to make users aware of tracking that is taking place, and optionally block all advertisements/trackers they detect. The major problem with advertisement/tracker detection and blocking services like AdBlock are that they, by definition, prevent relevant advertisements from being shown. At large scale, this leads to the tragedy of the commons where users block all advertisements/trackers and prevent publishers from earning revenue from their content. As these services achieve widespread adoption, it will eventually lead to the publishers unable to earn revenue, and thus make continuing their content creation infeasible.

U.S. Pat. No. 7,562,387 relates to a method and apparatus for gathering click stream information from Web surfers while maintaining their privacy. In accordance with this invention, a Web site that collects click stream information provides an opportunity for visitors to choose not to have personal information gathered about them. If a person chooses not to have personal information gathered, the Web site continues to collect click stream information about the visitor's progress through the Web site as before by the use of cookies and/or URL rewriting, for instance, using Single Pixel technology, in which the client machines are made to send requests to a usage analyzer having cookies bearing the relevant click stream data. However, the cookies include an extra field called a privacy flag. If the visitor chooses not to have personal information gathered, the flag is set. Otherwise it is reset. The usage analyzer software checks the privacy flag in the cookie of each request it receives and, if the flag is set, replaces the data in any field of the corresponding log entry containing personal information with a default value. Accordingly, the Web site operator can continue to gather click stream information from visitors without collecting personal information.

Present invention on the contrary deliberately alters the "clickstream" to obfuscate what the tracker sees in the first place. Therefore, present invention does not require the attacker to honor an optional flag set by the user, can be done transparently, and does not require the user to make decisions about what data should and should not be associated with their profile.

SUMMARY OF THE INVENTION

It is an object of the present invention to provide a method for protecting privacy of users from web-trackers, in which, a device such as a middlebox or a web-proxy, comprises performing the following steps: capturing a public unique identifier (e.g. cookies, IP addresses or browsers fingerprints, among others) set by a Website in a computing device of a user who requested access to said Website via the Internet; removing the captured public unique identifier from said users' computing device; monitoring, during a first configurable period of time, the web-requests the user makes to said Website and/or to other different Websites to obtain a web-behavioral profile of the user, and storing the obtained web-behavioral profile as a first vector representing what information of the user has been allowed to pass to a web-tracker; upon expiration of said configurable period of time, tracking, during a second configurable period of time, said web-requests made by the user, to examine the effect each web-request has on assisting the de-anonymization of the user, obtaining a second vector; classifying, the obtained second vector taking into account a computed similarity score parameter that considers the web-behavioral profile of the user with respect to a web-behavioral profile of one or more users and a threshold parameter related with the privacy of the user; creating and mapping a corresponding private unique identifier for said captured public identifier, said created and mapped private unique identifier being based on said classification; and executing, based on said mapping between the private and the public unique identifiers, an intervention algorithm for said web-tracker to protect privacy of the user therein taking into account a configured intervention policy.

According to an embodiment, the configured intervention policy comprises refusing to return the public unique identifier to the web-tracker.

According to another embodiment, the configured intervention policy comprises, when the user is determined to be classified below said threshold parameter, searching through the second vector of another user for a web-request that when added to the user's second vector minimizes the following function:

$$\Delta(\theta(sig,u'),\theta(sig,u))-\Delta(\theta(u',v),\theta(u,v))$$

where u' is the user's history with the addition of a candidate web-request from said another user, or v's, history and $\Delta$ is the difference between two similarity scores.

According to another embodiment, the configured intervention policy comprises using a pseudonym associated with the user by mapping the real name of the user with the created pseudonym.

According to yet another embodiment, the configured intervention policy comprises returning to the web-tracker a public unique identifier of another user, preferably having a similar web-behavioral profile to the user.

According to a preferred embodiment, the classifying step comprises ranking the obtained second vector.

Other embodiments of the invention that are disclosed herein also include a device and software programs to perform the method embodiment steps and operations summarized above and disclosed in detail below. More particularly, a computer program product is one embodiment that has a computer-readable medium including computer program instructions encoded thereon that when executed on at least one processor in a computer system causes the processor to perform the operations indicated herein as embodiments of the invention.

Therefore, present invention can be deployed in a transparent manner. For example, it can be deployed as a transparent web proxy, enabling users to gain protection without any complicated setup or configuration.

In addition, present invention it can be scaled to a large number of inputs and ensures that users' identity privacy is maintained. I.e., although they are served relevant advertisements, the user himself cannot be individually identified.

Present invention does not require either changes in the advertising ecosystem, meaning the massive investment in existing technologies and mechanisms will continue to pay dividends.

BRIEF DESCRIPTION OF THE DRAWINGS

The previous and other advantages and features will be more deeply understood from the following detailed description of embodiments, with reference to the attached, which must be considered in an illustrative and non-limiting manner, in which.

DETAILED DESCRIPTION OF THE INVENTION AND OF SEVERAL EMBODIMENTS

Present invention provides new methods and a new device for balancing the needs of users for privacy and the needs of advertisers for information to drive OBA. So, in present invention, when a particular user's browsing habits start making him uniquely identifiable, the proposed device intervenes via a private-to-public unique identifiers mappings using one of several configured policies aimed at restoring user anonymity within the context of the OBA ecosystem.

The proposed device 200 (also termed Web Identity Translator (WIT)) can be implemented in any middlebox or web proxy including CDN nodes or caches, acceleration proxies for wired or wireless networks, or VPN proxies. The latter are increasingly popular and can permit the proposed device 200 to operate seamlessly even if end to end HTTP encryption.

The proposed device 200 (which includes at least one processor and a memory) sits between a user 100 and a website 300 their want to visit, and sees each web-request (http traffic request) the user 100 makes via a computing device 100D, and can thus alter content that is sent to and received from the website 200 in question.

Figure 1:
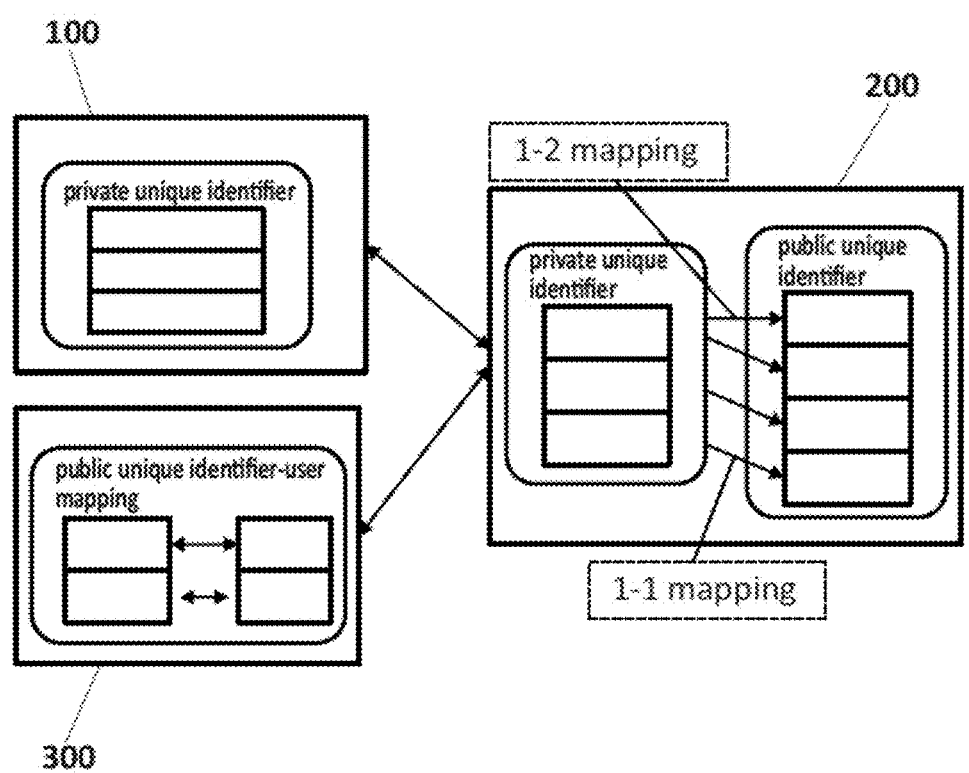
FIG. 1 illustrates a high level overview of the proposed invention architecture.

FIG. 1 shows a high level view of the proposed invention architecture. Much like NAT which projects private IPs addresses into the public IP address space and manages the mapping between them, the proposed device 200 manages mappings of private and public unique identifiers such as cookies, IP addresses or browsers fingerprints. The unique identifier setting/reading mechanism works as usual. The website 300 sets a standard (public) unique identifier on the user computing device 100D when the user 100 visits the website 300, typically when the user 100 visits the website 300 for the first time, but this public unique identifier is captured by the proposed device 200 and thus never reaches the user's computing device 100D (i.e. the browser). Instead, the proposed device 200 creates a corresponding private public identifier, associates it to the captured public one, and sets it on the user's computing device 100D. Inversely, when the user 100 returns to a website that hosts the same web-tracker, the proposed device 200 realizes it and returns the same public unique identifier that the web-tracker thought it has set to the browser of the user 100, but is actually served from the proposed device 200.

Figure 2:
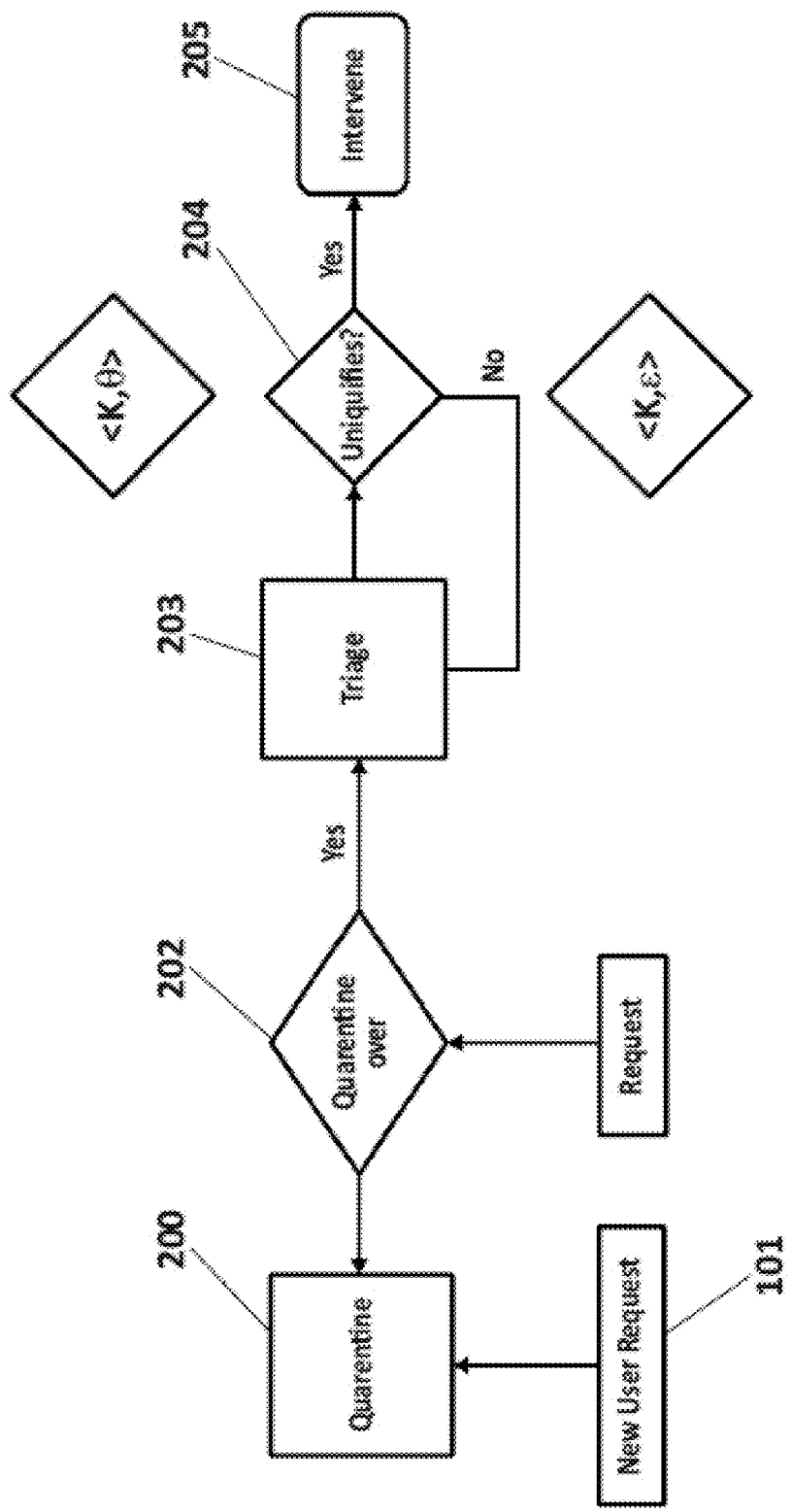
FIG. 2 is a schematic flow chart showing present inventions' basic operation according to an embodiment.

With reference now to FIG. 2 therein it is illustrated the basis operation of the proposed invention. When the proposed device 200 receives a request 101 from the user 100, it places him, during a first configurable period of time or quarantine phase 201, where all tracking is blocked until a web-behavioral profile of the user 100 or user's signature is obtained (i.e. some basic browsing patterns of the user 100 is learned). This web-behavioral profile of the user 100 is stored as a first vector (or history vector) and will be used to make intervention decisions later on, based on a classification of the private unique identifiers in respect to this web-behavioral profile of the user 100. The length of the first configurable period is implementation dependent and can be tuned to better suit particulars of the users and advertisements networks. For an embodiment, said first configurable period is set to be one week, not limitative, as it has been proven that even shorter periods will suffice.

Upon expiration of said configurable first period of time, or alternatively once there is sufficient data, the user 100 enters the triage phase 203 where the proposed device 200 tracks, during a second configurable period of time (e.g. one week also) all the web-requests made by the user 100 to examine the effect each request has on potentially assisting the de-anonymization of the user 100 obtaining a second vector or user's browsing history. In order to avoid this, the proposed device 200 monitor the user 100 during said second configurable period of time, and intervenes if the current web history of the user 100 it is classified (preferably showed as a rank) among the top K web histories in respect to the user 100 web-behavioral profile. During the triage phase 203, multiple history vectors could be associated with the user 100. These history vectors correspond to a public unique identifier, and represent what information of the user 100 has been allowed to pass to the web-tracker. The triage phase 203 is responsible to guarantee that none of these history vectors can be linked with high probability to the first vector of the user 100 that is associated with them. The general intervention trigger 205 would depend on an exact configured intervention policy used but revolves around the classification of users.

To protect users against attacks attempting to classify users based on the similarities of their web-behavioral profile, so that they can match web histories to actual users, the proposed device 200 maintains a classification of all users (preferably, as said before by rankings them) taking into account a computed similarity score that considers the web-behavioral profile of the user 100 with respect to a web-behavioral profile of one or more users and a threshold parameter, so the proposed device 200 attempts to stop the web histories of users from ranking very high with their web-behavioral profile, thus being identifiable. By reducing the rank of the user 100 below a threshold K, the probability of an attacker successfully identifying the user 100 is considerably reduced. The threshold can be tuned to provide enhanced privacy at the expense of advertising relevance, but preferably it is used a threshold K=10.

Finally, the proposed device 200, based on the ranking, can create and map the private unique identifier with the captured public unique identifier, and can execute an intervention algorithm for said web-tracker taking into account the exact configured intervention policy.

According to a first embodiment, the configured intervention policy comprises a unique identifier dropping intervention that simply refuses to return the public unique identifier associated with the user 100 to the web-tracker. In essence, this results in a particular request being associated with a "new" user instead of the profile of the user himself. The decision to drop a unique identifier is made by calculating the ranking of the current web history as it has been allowed to leak against the web-behavioral profile collected during the quarantine phase 201.

If a request causes the rank to drop, the request is allowed to pass, while in the opposite case, the tracking unique identifiers associated with this request are dropped. Rarely a single request can affect the ranking, so in the case where a request does not affect the ranking the $\Delta(\theta(sig, u'), \theta(sig, u))$ is calculated. If it is negative, therefore driving the user 100 away from his web-behavioral profile, the unique identifier is allowed to pass while in the opposite case it is dropped.

According to a second embodiment, the configured intervention policy, or history padding intervention, comprises, as web-requests arrive, and if the current web history of the user 100 is determined to be ranked below said K threshold, searching through the history of the Kth ranked user for a request that, when added to user's browsing history minimizes the function:

$$\Delta(\theta(sig,u'),\theta(sig,u))-\Delta(\theta(u',v),\theta(u,v))$$

where u' is the user's history with the addition of the candidate web-request (URL) from v's history and $\Delta$ is the (signed) difference between two similarity scores.

Figure 3:
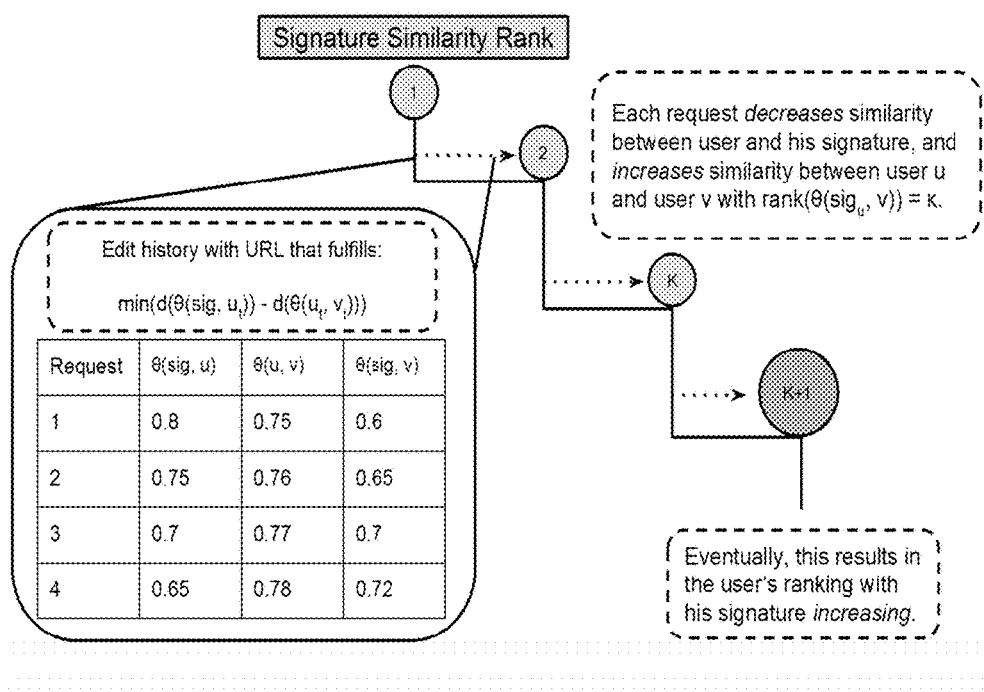
FIG. 3 shows a high level view of the operation of the history padding intervention policy according to an embodiment.

FIG. 3 drafts a high level view of this configured intervention policy of said second embodiment. The core idea is to choose the optimal intervention that increases the distance of the user 100 from their web-behavioral profile while simultaneously decreasing the distance between the user 100 and Kth ranked user from the web-behavioral profile. Eventually, this push-and-pull mechanism results in the user's 100 re-identification rank increasing, making him exceedingly hard to manually re-identify.

Alternatively, another way of putting it is that the proposed device 200 decreases the similarity of the user 100 and their web-behavioral profile and at the same time increases the similarity of the user 100 and the user that has the Kth ranked similarity score with the web-behavioral profile.

According to a third embodiment, the configured intervention policy comprises triggering a pseudonym to be created for the user 100 such that there is now an additional profile associated with the user 100. This is accomplished by creating a one-to-many mapping of unique identifiers from the user's "real" identity to each pseudonym. The proposed device 200 will then balance requests using the multiple pseudonyms to ensure privacy is preserved.

According to a fourth embodiment, the configured intervention comprises transmitting the public unique identifier of a different but relatively similar user, thus obfuscating the original user's behavior. This configured intervention is basically the inverse of history padding, so instead of taking a request from another user's history, the proposed device 200 inserts a request into another user's history.

Although the proposed device 200 as presented performs quite well at balancing privacy and advertising needs, several improvements can be made. For example, the history padding algorithm is greedy and biased towards preserving privacy. To address this, instead of intervening with the URL that most improves privacy, the proposed device 200 could be augmented to make use of semantic information about the URLs that are requested and choose to intervene with one that maintains the same set of behavioral profiling tags attached to the user 100. By changing the weight given to improvement of identification privacy vs. accuracy of behavioral tags, the proposed device 200 can provide an easy to tune privacy preserving mechanism while still providing advertisers with relevant user knowledge.

Evaluation

In an embodiment, to evaluate the performance of the proposed device 200, an initial evaluation was made using two datasets (D1 and D2) and the configured intervention policies of the first and second embodiments (unique identifier dropping intervention and history padding intervention). Dataset D1 is composed of browsing history donated by Firefox users. The browsing history includes all the pages that the users visited including HTTP and HTTPS. The dataset D1 is made available in obfuscated form where user ids and the URLs they visited are hashed. A one month of data consisting of 6 million total requests from 529 users was used. Dataset D2 is derived from traffic logs of a VPN proxy for mobile users operated by a large telecom provider in Europe. This dataset D2 represents mobile traffic over the VPN proxy but does not include HTTPS traffic. Users are identified with an internal proxy identifier that is not linked to any personal information such as real name or phone number. In total approximately 3 weeks of data, consisting of 2.5 million requests from 730 users were used.

Similarity Metrics

The most commonly used metrics in user similarity studies are Jaccard index and cosine similarity. The problem with Jaccard index is that it operates solely on set membership and therefore cannot capture properties like frequency/popularity. For this reason, the Vector Space Model was used as a representation of users' histories and cosine similarity with tf-idf weights to calculate similarity. Tf-idf is widely used in information retrieval and it manages to reduce the impact of very popular terms.

For two users' u and v, their similarity is calculated as follows:

$$\theta(u, v) = \frac{\sum_{i=1}^{n} u_i \times v_i}{\sqrt{\sum_{i=1}^{n} u_i^2} \times \sqrt{\sum_{i=1}^{n} v_i^2}}$$

The values of the attributes $u_i$, $v_i$ are the corresponding tf-idf values.

For example:

$$u_i = tf_i \times \left(1 + \ln\left(\frac{N}{df_i + 1}\right)\right)$$

Where $tf_i$ is the number of times user 'u' has visited webpage i, N is the total number of users and $df_i$ is the number of users who have webpage i in their histories.

If two users visit the same set of websites the same number of times in a given time period, their cosine similarity will be 1, and if there is no overlap in their browsing history it will be 0. It is important to note that in this proposal, present invention operates on the domain level, meaning that each attribute corresponds to visits to domain and not a full URL. This is done for two reasons: 1) using domains only highlights similarity and repeated browsing patterns, and 2) from a semantic point of view, it is often times more relevant that a user has visited a given site instead of any particular page on that site.

That said, other implementations can improve the granularity of the browsing history, e.g., using semantic value of subdomains or content on pages.

Experimental Setup

Using the datasets mentioned earlier (D1 and D2), the function of the present invention was simulated by replaying the web-request in the two logs. Each dataset was splatted in two parts, one which will be used for the quarantine phase 201 and one which will be used for the triage phase 203 when the present invention starts intervening on users' histories. The simulation starts by reading the quarantine part of the logs and storing the corresponding vectors. Once the quarantine phase is over 202, the second part of the dataset is read line by line, effectively simulating the web-requests as they would arrive in a proxy. Before present invention starts to intervene 205, a small training period is allowed for each user, so as to gather a basic history vector. These experiments are designed to determine if the proposed device 200 can effectively push users away from their web-behavioral profile and how much intervention it required for this.

FIGS. 4-7 illustrate different embodiments in which the proposed device 200 can be used.

Figure 4:
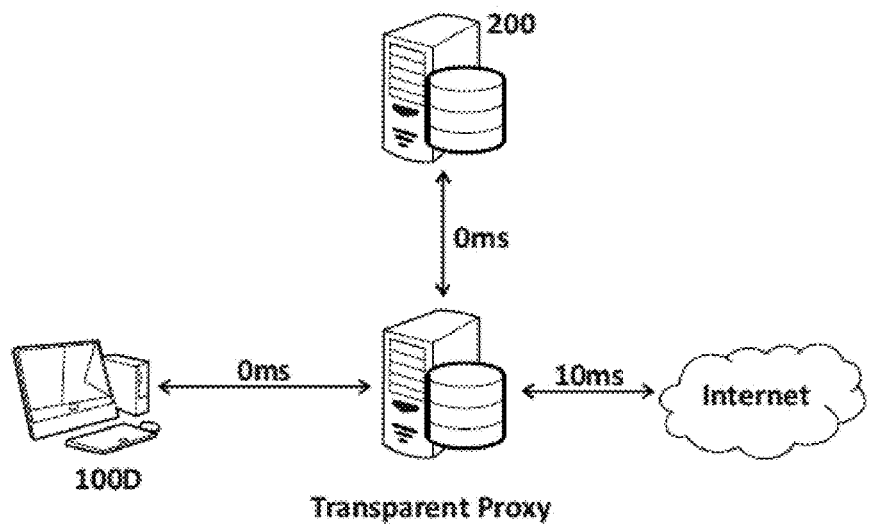
FIGS. 4 to 7 illustrate different embodiments in which present invention can be used.

According to the embodiment of FIG. 4, the proposed device 200 can work as a transparent, and easy to deploy, proxy to automatically manage privacy, having access to all unencrypted unique identifiers and being able to provide fine-grained statistics about user web-traffic (full URLs for encrypted traffic and domain names from certificates for encrypted web-traffic).

Figure 5:
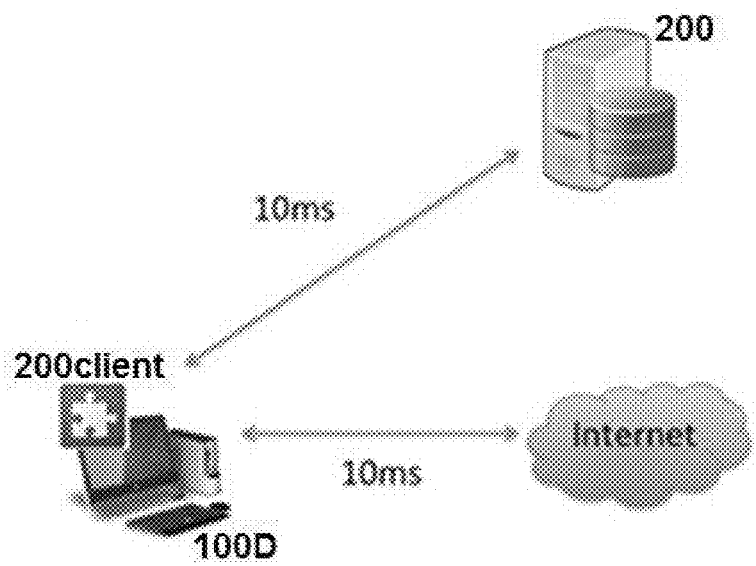

According to the embodiment of FIG. 5, the proposed device 200 can work as an independent service that clients can query directly. In this case, the proposed device 200 can have access to encrypted and unencrypted unique identifiers and to fine-grained statistics about user traffic.

Figure 6:
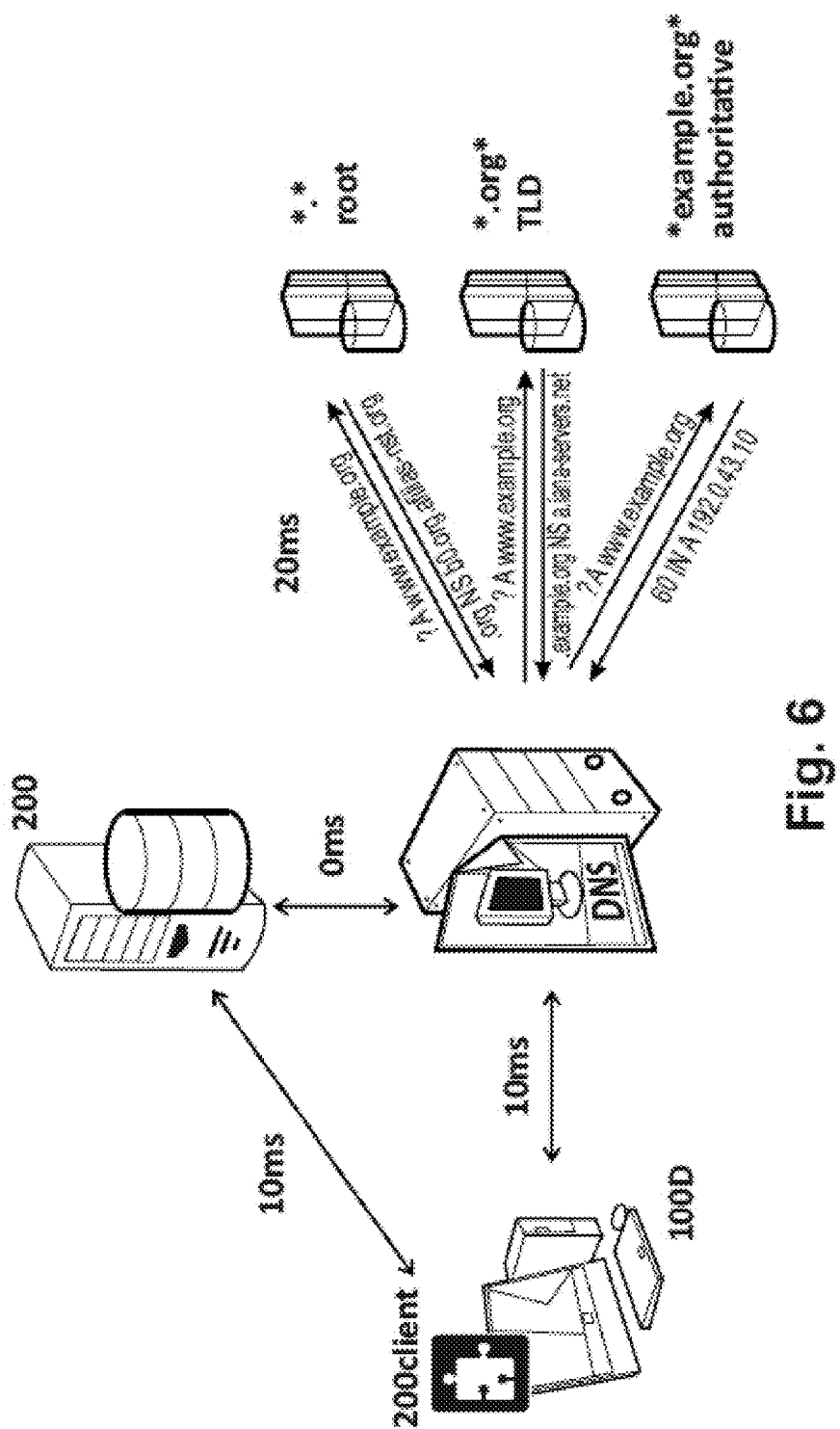

According to the embodiment of FIG. 6, the proposed device 200 can use a DNS system and extended DNS messages to provide intervention suggestions to users. So, the proposed device 200 will have access to encrypted and unencrypted unique identifiers, to medium-grained statistics about user web-traffic and will have low latency (lazily uses low latency link (~10 ms) to report frequency info, and piggy back on DNS latency for proposed device 200 computation).

Figure 7:
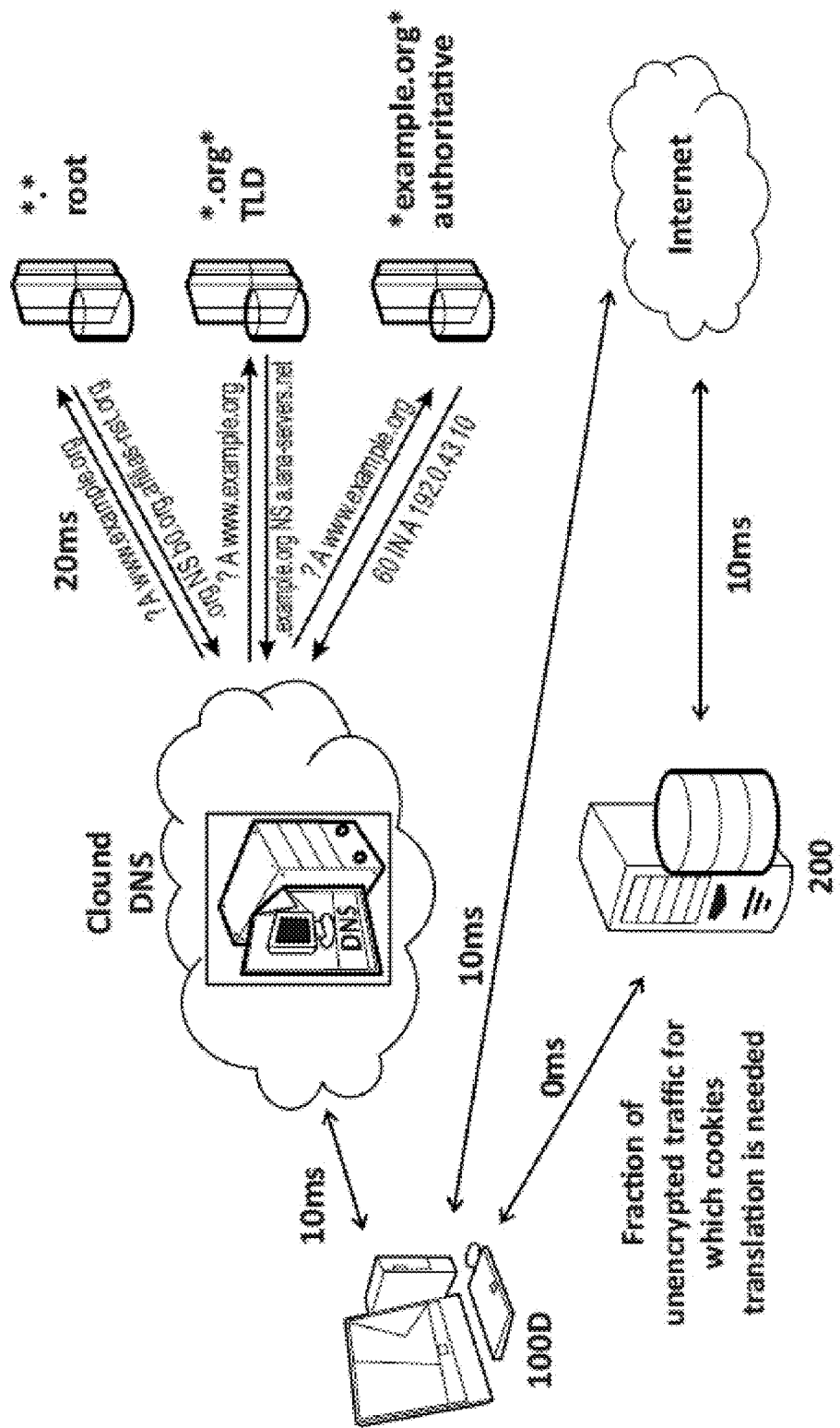

According to the embodiment of FIG. 7, a cloud DNS server redirects domain name lookups to the proposed device 200, accomplishing low/medium-grained statistics about user web-traffic (DNS queries), high privacy, low latency and having a zero cost for its deployment.

According to yet another embodiments (not illustrated), the proposed device 200 can work as a peer-to-peer web proxy, instead of a centralized web proxy, so users could establish their own P2P system of exchanging browsing history and web-behavioral profiles. In this scenario, an additional mechanism to ensure that user shared data in appropriate/secure fashion would need to be created. Finally, the proposed device 200 could extent current web browsers, by allowing the users to send the relevant contents of encrypted traffic in plaintext to the proposed device 200.

The proposed invention may be implemented in hardware, software, firmware, or any combination thereof. If implemented in software, the functions may be stored on or encoded as one or more instructions or code on a computer-readable medium.

Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. Any processor and the storage medium may reside in an ASIC. The ASIC may reside in a user terminal. In the alternative, the processor and the storage medium may reside as discrete components in a user terminal.

As used herein, computer program products comprising computer-readable media including all forms of computer-readable medium except, to the extent that such media is deemed to be non-statutory, transitory propagating signals.

The scope of the present invention is defined in the following set of claims.

REFERENCES

[1] V. Toubiana, et. al. Adnostic: Privacy preserving targeted advertising. In Proceedings Network and Distributed System Symposium, 2010.
[2] S. Guha, et. al. Privad: Practical privacy in online advertising.
[3] N. Laoutaris. Cows, privacy, and tragedy of the commons on the web. http://www.thedigitalpost.eu/2015/channel-data/cows-privacy-tragedy-commons-web, 2015.
[4] R. Joe. The cross-device question: Krux, https://web.archive.org/web/20150629100752/http://adexchanger.com/data-exchanges/the-cross-device-question-krux/, 2014

The invention claimed is:

1. A method for protecting privacy of users from web-trackers, the method comprising:
    capturing, by a device (200), a public unique identifier set by a Website (300) in a computing device (100D) of a user (100) who requested access to said Website (300) via the Internet,
    removing, by the device (200), the captured public unique identifier from said users' computing device (100D);
    monitoring, by the device (200), during a first configurable period of time, web-requests the user (100) makes to said Website (300) and/or to other different Websites to obtain a web-behavioral profile of the user (300), and storing the obtained web-behavioral profile as a first vector representing what information of the user (100) has been allowed to pass to a web-tracker;
    upon expiration of the first configurable period of time, tracking, by the device (200), during a second configurable period of time, the web-requests made by the user (100), to examine the effect each web-request has on assisting the de-anonymization of the user (100), obtaining a second vector;
    classifying, by the device (200), the obtained second vector taking into account a computed similarity score parameter that considers the web-behavioral profile of the user (100) with respect to a web-behavioral profile of one or more users and a threshold parameter related with the privacy of the user (100);
    creating and mapping, by the device (200), a corresponding private unique identifier for said captured public identifier, said created and mapped private unique identifier being based on said classification; and
    executing, by the device (200), based on said mapping between the private and the public unique identifiers, an intervention algorithm for said web-tracker to protect privacy of the user (100) therein taking into account a configured intervention policy.

2. The method of claim 1, wherein said configured intervention policy comprises refusing to return said public unique identifier to the web-tracker.

3. The method of claim 1, wherein said configured intervention policy comprises, when the user (100) is determined to be classified below said threshold parameter, searching through the second vector of another user for a web-request that when added to the user's second vector minimizes the following function:

$$\Delta(\theta(sig,u'),\theta(sig,u))-\Delta(\theta(u',v),\theta(u,v))$$

where u' is the user's history with the addition of a candidate web-request from said another user, or v's, history and Δ is the difference between two similarity scores.

4. The method of claim 1, wherein said configured intervention policy comprises using a pseudonym associated with the user (100) by mapping the real name of the user (100) with the created pseudonym.

5. The method of claim 1, wherein said configured intervention policy comprises returning to the web-tracker a public unique identifier of another user.

6. The method of claim 5, wherein said another user have a similar web-behavioral profile to the user (100).

7. The method of claim 1, wherein said classifying step comprises ranking the obtained second vector.

8. The method of claim 1, wherein said capturing step being performed the first time the user (100) requests access to said Website (300).

9. The method of claim 1, comprising monitoring, during the first configurable period of time, all the web-requests the user (100) makes to the Website (300).

10. The method of claim 1, wherein said public and/or private unique identifier comprises at least one of cookies, IP addresses or browsers fingerprints.

11. The method of claim 1, wherein said device (200) comprises a middlebox or a web proxy server.

12. A device for protecting privacy of users from web-trackers, comprising:
a processor; and
a memory having a plurality of computer program code instructions embodied thereon and configured to be executed by the processor, the plurality of computer program code instructions comprising instructions to:
capture a public unique identifier set by a Website (300) in a computing device (100D) of a user (100) who visit said Website (300) via the Internet,
remove, the captured public unique identifier from said users' computing device (100D);
monitor, during a first configurable period of time, web-requests the user (100) makes to said Website (300) and/or to other different Websites to obtain a web-behavioral profile of the user (300), and storing the obtained web-behavioral profile as a first vector representing what information of the user (100) has been allowed to pass to a web-tracker;
upon expiration of the first configurable period of time, track, during a second configurable period of time, the web-requests made by the user (100), to examine the effect each request has on assisting the de-anonymization of the user (100) obtaining a second vector;
classify, the obtained second vector taking into account a computed similarity score parameter that considers the web-behavioral profile of the user with respect to a web-behavioral profile of one or more users and a threshold parameter related with the privacy of the user (100);
create and map, a corresponding private unique identifier for said captured public identifier, said created and mapped private unique identifier being based on said classification; and
execute, based on said mapping between the private and the public unique identifiers, an intervention algorithm for said web-tracker to protect privacy of the user (100) therein taking into account a configured intervention policy.

13. The device of claim 12, being a middlebox.

14. The device of claim 12, being a web proxy server including at least CDN nodes or web caches, acceleration proxies for wired or wireless networks, or VPN proxies.

15. The device of claim 12, wherein said public and/or private unique identifier comprises at least one of cookies, IP addresses or browsers fingerprints.

16. A non-transitory computer readable medium comprising program code instructions which when loaded into a computer system controls the computer system to protect privacy of users from web-trackers by:
capturing a public unique identifier set by a Website (300) in a computing device (100D) of a user (100) who requested access to said Website (300) via the Internet;
removing the captured public unique identifier from said users' computing device (100D);
monitoring, during a first configurable period of time, web-requests the user (100) makes to said Website (300) and/or to other different Websites to obtain a web-behavioral profile of the user (300), and storing the obtained web-behavioral profile as a first vector representing what information of the user (100) has been allowed to pass to a web-tracker;
upon expiration of the first configurable period of time, tracking, during a second configurable period of time, the web-requests made by the user (100), to examine the effect each web-request has on assisting the de-anonymization of the user (100), obtaining a second vector;
classifying the obtained second vector taking into account a computed similarity score parameter that considers the web-behavioral profile of the user (100) with respect to a web-behavioral profile of one or more users and a threshold parameter related with the privacy of the user (100);
creating and mapping a corresponding private unique identifier for said captured public identifier, said created and mapped private unique identifier being based on said classification; and
executing, based on said mapping between the private and the public unique identifiers, an intervention algorithm for said web-tracker to protect privacy of the user (100) therein taking into account a configured intervention policy.

17. The method of claim 1, wherein the computed similarity score parameter identifies a similarity between a current web history of the user (100) and the web-behavioral profile of the user (100), and another set of computed similarity score parameters identifies similarities between web histories of the one or more users and the web-behavioral profile of the user (100); and
where classifying the obtained second vector further comprises:
classifying the obtained second vector based on the computed similarity score parameter and the other set of computed similarity score parameters.

18. The method of claim 1, wherein the threshold parameter identifies a number of other users, of the one or more users, that include a respective web-behavioral profile that is more similar to the web-behavioral profile of the user (100) than a current web history of the user (100) is to the web-behavioral profile of the user (100).

19. The method of claim 1, further comprising:
reducing a rank of the user (100) below another rank identified by the threshold parameter; and
where executing the intervention algorithm further comprises:
executing the intervention algorithm based on reducing the rank of the user (100) below the other rank identified by the threshold parameter.

20. The method of claim 1, further comprising:
determining other computed similarity score parameters, of the one or more users, based on web-behavioral profiles of the one or more users and the web-behavioral profile of the user (100); and
where classifying the obtained second vector further comprises:
classifying the obtained second vector based on the other computed similarity score parameters.

* * * * *